UNITED STATES PATENT OFFICE.

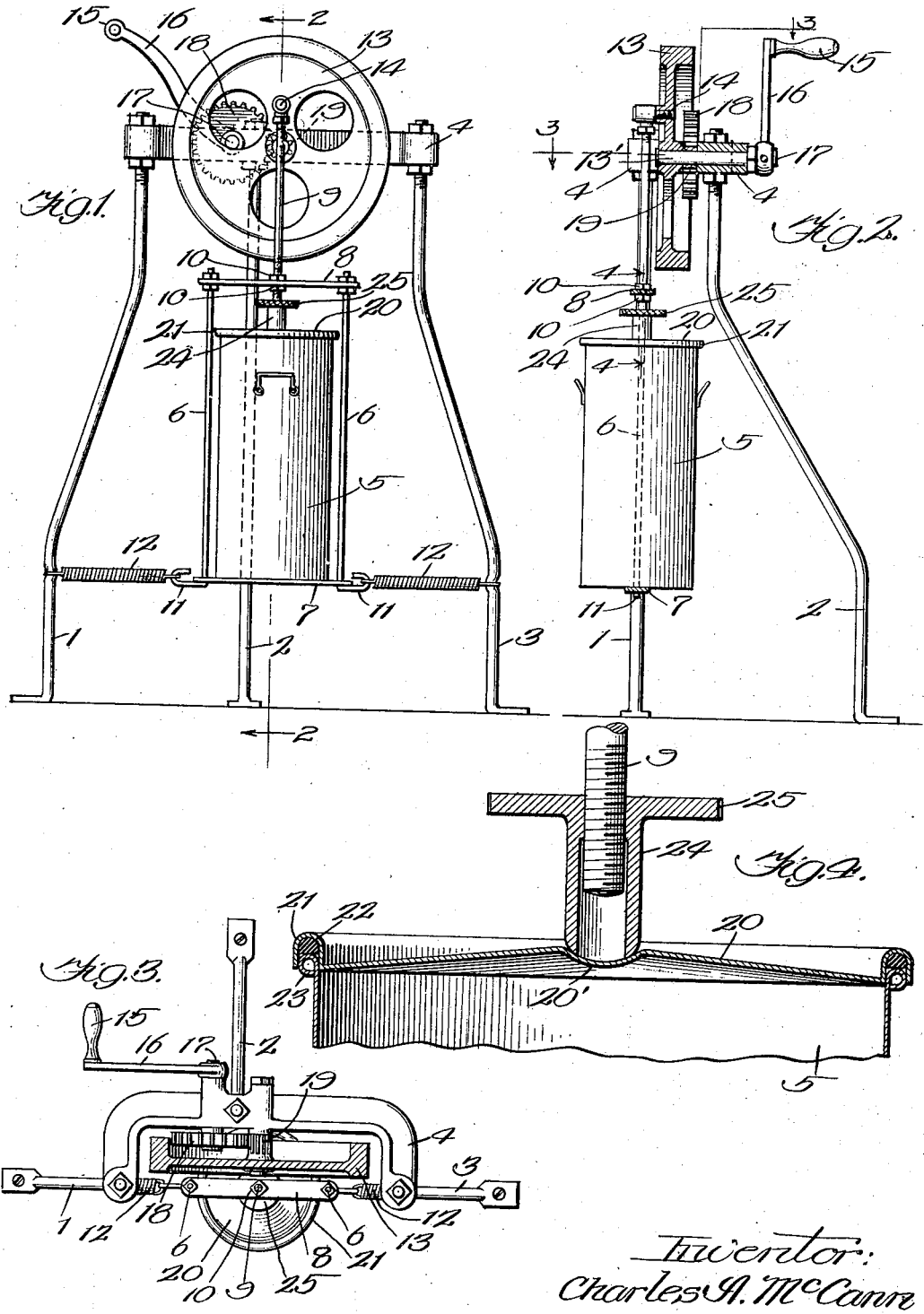

CHARLES A. McCANN, OF SPRINGFIELD, ILLINOIS.

CHURN.

1,242,218.      Specification of Letters Patent.      Patented Oct. 9, 1917.

Application filed August 2, 1917. Serial No. 184,048.

*To all whom it may concern:*

Be it known that I, CHARLES A. McCANN, a citizen of the United States, residing at Springfield, in the county of Sangamon and State of Illinois, have invented a certain new and useful Improvement in Churns, of which the following is a full, clear, concise, and exact description.

My invention relates to churns and has for an object the provision of operating mechanism therefor whereby the cream container may be bodily reciprocated and may also be oscillated as it reciprocates. By imparting to the container combined reciprocatory and oscillatory movements the churning operation is very rapidly and most efficiently performed. The mounting for the container is such as to permit the container to be reciprocated and oscillated concurrently and is desirably inclusive of two extensible and contractible elastic members (preferably coiled wire springs) that are anchored at their outer ends and are attached at their inner ends to the container at one of its ends, preferably the lower end. The actuating mechanism for concurrently reciprocating and oscillating the container and controlling the movements thereof is preferably inclusive of a fly wheel in crank connection with the upper end of the container; an operating crank, and speed increasing gearing operatively connecting said operating crank and wheel. By this mechanism the container is rapidly put through its cycles of concurrent reciprocatory and oscillatory movements, the fly wheel furnishing sufficient momentum to cause the repeated cycles of movement to be in conformity and enabling the employment of substantially uniform driving torque to the operating crank.

My invention has been embodied in a hand operated mechanism in which event the operating crank is inclusive of a crank handle that is actuated by the user to turn the container agitating fly wheel through the intermediation of the aforesaid speed increasing gearing.

I will explain my invention more fully by reference to the accompanying drawing showing the preferred embodiment thereof and in which Figure 1 is a front elevaton of a churn equipped in accordance with the invention; Fig. 2 is a view on line 2—2 of Fig. 1; Fig. 3 is a view on line 3—3 of Fig. 2; and Fig. 4 is a view, on a larger scale, on line 4—4 of Fig. 2.

Like parts are indicated by similar characters of reference throughout the different figures.

The mounting frame may be of light construction, the frame illustrated including three upright legs 1, 2 and 3 which are joined at their upper ends by the frame piece 4 upon which the actuating mechanism, to be more specifically described later, is directly supported. A cream container 5, preferably cylindrical, is removably secured in an upright rectangular container supporting frame formed of upright sides 6, a base 7, and a top 8. A rod 9 has its lower end threaded, this threaded end of said rod passing through the top 8 and being held in assembly therewith by nuts 10 which are upon the threaded end of the rod 9 and between which nuts the top 8 is disposed and clamped, the arrangement being such that the rod 9 is practically in fixed relation with respect to the container supporting frame. The lower ends of the sides 6 are laterally extended to form hooks 11 that are in alinement with the base 7. The inner ends of the extensible and contractible elastic members 12 are secured to the hooks 11 while the outer ends of these elastic members are anchored to the legs 1 and 3 which legs are so positioned as to bring these elastic members into alinement with the base 7 of the container supporting frame. The elastic members 12 are desirably in the nature of coiled springs of sufficient strength and under sufficient tension to coöperate with the actuating mechanism.

The rod 9 functions as a pitman, having crank connection with the fly wheel 13 through the intermediation of a crank pin 14; the pitman 9, the crank pin 14, and the container supporting frame constituting the preferred means whereby the container 5 is brought into crank connection with the fly wheel. The crank pin or connection of the fly wheel with the container also takes part in supporting the container. As the machine illustrated is a hand operated machine there is employed a crank handle 15 that is attached to an operating crank 16. The crank shaft 17 that carries the crank 16 is journaled in the top piece 4 of the mounting frame. A spur gear 18 is fixed upon the crank shaft 17 and meshes with the spur pinion 19 fixed upon wheel 13 and turning upon the fly wheel shaft $13^1$ which is preferably fixed upon the top piece 4 of the mounting frame. By means of the speed increasing gearing 18 and 19 the fly wheel 13 is turned at a high rate of speed with respect to the rotation of the crank shaft 17. This wheel 13 furnishes momentum whereby the application of operating torque to the crank 16 may be substantially uniform and whereby the fly wheel load may be actuated by the fly wheel with regularity. The container 5 is supported upon the base 7 of the container supporting frame that incloses it, the axis of the container intercepting the frame base 7 and being coincident with the axis of the pitman rod 9 whereby the springs 12 are alined with a diametrical line of the bottom of the container. The container is desirably supplied with cream to sixty per cent. of its capacity to get the best results whereafter the container lid 20 is applied. This container lid has a peripheral groove 21 that holds a rubber gasket 22 and receives the annular bead or rim 23 at the upper end of the body of the container. The container lid is dished upwardly and has a central seat 20¹ that receives the correspondingly shaped lower end of a sleeve nut 24 that is in threaded engagement with the lower end of the pitman rod 9. This sleeve nut has a knurled flange 25 by which the nut may be turned along the pitman rod 9. By screwing the nut 24 downwardly and against the seat 20¹ the gasket 22 is tightly pressed against the bead 23 hermetically to seal the engagement between the lid and body of the container. When the churn has thus been adjusted it may be actuated to effect reciprocation thereof and also the oscillation thereof concurrently with such reciprocation, the oscillation occurring about the center of the bottom of the reciprocating container. The body of cream is thus violently shifted longitudinally with respect to the container and is laterally violently shifted with respect to the container, there being also a resultant combination of these movements imparted to the cream.

The springs 12 coöperate with the actuating mechanism to relieve it of some of its load, these springs tending to restore the container to mid-positions. The spring supports 12 may be said to act as a mounting upon which the container floats and in opposition to which the container is concurrently reciprocated and oscillated. This container is desirably made of seamless metal, preferably aluminum, so that it may readily be cleaned.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a churn, the combination with a container; of two oppositely disposed coiled springs that are anchored at their outer ends and are attached at their inner ends to the container; and a fly wheel in crank connection with said container to support the same and oscillate it upon said springs and reciprocate it as it is oscillated.

2. In a churn, the combination with a container; of two oppositely disposed coiled springs that are anchored at their outer ends and are attached at their inner ends to the container; and a crank coupled with said container to support the same and oscillate it upon said springs and reciprocate it as it is oscillated.

3. In a churn, the combination with a container; of two oppositely disposed coiled springs that are anchored at their outer ends and are attached at their inner ends to the container; and actuating mechanism for the container which oscillates it upon said springs and reciprocates it as it is oscillated.

4. In a churn, the combination with a container; of a spring mounting for the container that permits the container to oscillate thereupon and to reciprocate as it oscillates; and a fly wheel in crank connection with said container to support the same and reciprocate it and oscillate it as it is reciprocated.

5. In a churn, the combination with a container; of two extensible and contractible elastic members that are anchored at their outer ends and are attached at their inner ends to the container; a fly wheel in crank connection with said container to support the same and oscillate it upon said elastic members and reciprocate it as it is oscillated.

6. In a churn, the combination with a container; of two extensible and contractible elastic members that are anchored at their outer ends and are attached at their inner ends to the container; and a crank coupled with said container to support the same and oscillate it upon said elastic members and reciprocate it as it is oscillated.

7. In a churn, the combination with a container; of two extensible and contractible elastic members that are anchored at their outer ends and are attached at their inner ends to the container; and actuating mechanism for the container which oscillates it upon said elastic members and reciprocates it as it is oscillated.

In witness whereof, I hereunto subscribe my name this thirtieth day of July, A. D., 1917.

CHARLES A. McCANN.